United States Patent
Haugh et al.

(10) Patent No.: US 9,009,674 B1
(45) Date of Patent: *Apr. 14, 2015

(54) FLASH TESTING FRAMEWORK

(71) Applicant: Versata Development Group, Inc., Austin, TX (US)

(72) Inventors: Justin Haugh, San Francisco, CA (US); Ryan Kennedy, Eastampton, NJ (US); Matt Schemmel, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/709,625

(22) Filed: Dec. 10, 2012

Related U.S. Application Data

(63) Continuation of application No. 11/474,790, filed on Jun. 26, 2006, now Pat. No. 8,332,818.

(51) Int. Cl.
G06F 9/44 (2006.01)
G06F 11/36 (2006.01)

(52) U.S. Cl.
CPC ........ *G06F 11/3672* (2013.01); *G06F 11/3696* (2013.01); *G06F 11/362* (2013.01)

(58) Field of Classification Search
None
See application file for complete search history.

(56) References Cited

U.S. PATENT DOCUMENTS

| | | | |
|---|---|---|---|
| 5,410,681 A * | 4/1995 | Jessen et al. | 703/27 |
| 5,592,602 A | 1/1997 | Edmunds et al. | |
| 5,623,593 A | 4/1997 | Spells, III | |
| 5,872,973 A | 2/1999 | Mitchell et al. | |
| 6,128,712 A | 10/2000 | Hunt et al. | |
| 6,279,124 B1 | 8/2001 | Brouwer et al. | |
| 6,385,769 B1 | 5/2002 | Lewallen | |
| 6,587,879 B1 | 7/2003 | Reynolds | |
| 6,928,648 B2 | 8/2005 | Wong et al. | |
| 7,010,782 B2 | 3/2006 | Narayan et al. | |
| 7,127,641 B1 | 10/2006 | Anderson | |

(Continued)

OTHER PUBLICATIONS

Information Technology Service, Creating Animation and Interactivity with Flash, Guide 146, Version 1.3, University of Durham Information Technology Service, Jun. 2006.

(Continued)

*Primary Examiner* — Jason Mitchell
(74) *Attorney, Agent, or Firm* — Terrile, Cannatti, Chambers & Holland, LLP; Michael Rocco Cannatti

(57) ABSTRACT

A computer-based automated testing framework tests a multimedia application (such as a Flash application running in a player module) that includes one or more Flash objects by executing test scripts in an external Java-based test module that uses proxy objects in the test module to represent the Flash objects in the player module. Correspondence between the proxy object and Flash objects is maintained by translating the first test script into a command, sending the command from the external test module to the player module, interpreting the command by accessing a lookup table at the player module, and then returning a value to the external test module in response to the command.

16 Claims, 7 Drawing Sheets

(56) References Cited

U.S. PATENT DOCUMENTS

| | | |
|---|---|---|
| 7,437,261 B2 | 10/2008 | Pramanick et al. |
| 7,581,212 B2 | 8/2009 | West et al. |
| 7,650,593 B2 | 1/2010 | Horton et al. |
| 8,332,818 B1 * | 12/2012 | Haugh et al. .................. 717/124 |
| 2002/0103813 A1 * | 8/2002 | Frigon ....................... 707/104.1 |
| 2003/0101235 A1 | 5/2003 | Zhang |
| 2003/0195923 A1 | 10/2003 | Bloch et al. |
| 2005/0021754 A1 * | 1/2005 | Alda et al. .................... 709/225 |
| 2005/0028084 A1 * | 2/2005 | Dziejma ....................... 715/505 |
| 2005/0155043 A1 * | 7/2005 | Schulz et al. ................. 719/328 |
| 2006/0048229 A1 * | 3/2006 | Bronstein ....................... 726/25 |
| 2006/0161897 A1 * | 7/2006 | Biberstein et al. ............. 717/124 |
| 2007/0028172 A1 * | 2/2007 | Greer et al. ................... 715/705 |
| 2007/0250618 A1 | 10/2007 | Hammond |
| 2008/0228789 A1 | 9/2008 | Asakawa et al. |
| 2009/0083578 A1 * | 3/2009 | Nan et al. ........................ 714/28 |
| 2010/0232770 A1 | 9/2010 | Prestenback et al. |
| 2010/0268573 A1 | 10/2010 | Jain et al. |

OTHER PUBLICATIONS

K. Lynch, The Flash® Platform, White paper, Macromedia, Jun. 2005.

Moockblog: New Unit Testing Framework Launched, printed Sep. 25, 2006, 2 pages.

Moravia Worldwide—software localization, translation, testing, internationalization homepage www.moraviaworldwide.com, printed Sep. 26, 2006, 2 pages.

IOpus homepage, www.iopus.com, printed Sep. 26, 2006, 5 pages.

IOpus iMacros Version 5, www.iopus.com/imacros/, printed Sep. 26, 2006, 5 pages.

Testing your movies, www.informit.com, Flash Reference Guide, printed Aug. 24, 2005, (first 2 pages only since last 2 pages included only links unrelated to article).

Testing strategies for Macromedia Flash movies, Macromedia Flash Support Center, www.macromedia.com, printed Aug. 24, 2005, 6 pages.

* cited by examiner

FLASH TESTING FRAMEWORK

CROSS-REFERENCE TO RELATED APPLICATIONS

This application is a continuation of co-pending U.S. application Ser. No. 11/474,790, filed Jun. 26, 2006, which is incorporated herein by reference in its entirety.

BACKGROUND OF THE INVENTION

1. Field of the Invention

The present invention relates in general to the field of program testing. In one aspect, the present invention relates to a system and method for testing multimedia applications, such as Macromedia Flash applications.

2. Description of the Related Art

In recent years, multimedia works containing different types of "media" content (such as text, sound, video, still and animated graphics, etc.) have been used to deliver information to viewers via televisions, computers or computer networks, such as the Internet. FIG. 1 illustrates an Internet-based system for distributing multimedia works using server-deployed software that enables developers to easily and economically create network-aware applications with rich, interactive user-interfaces. In the illustration, the application server 10 includes a browser 12 with a player 13 and an authoring program 11 for creating object code of a given multimedia work. The object code may be sent to a client for playback at a remote user interface, such as on the player 16 at the client browser 15. Communication between the various elements can be via network, dedicated connection, wireless connection, or any other connection that is suitable for appropriate communication. At the remote client 15, a player 16 is provided as a software environment, hardware, or a set of one or more software programs, etc. that can display graphics and play sound.

An example of a multimedia authoring program and player for creating and playing multimedia works is the Macromedia Flash suite of programs. ("Flash" and "Macromedia Flash" are registered trademarks of Adobe Systems, Inc.) Flash is an interactive alternative to traditional graphical user interface (GUI) technologies, such as HyperText Markup Language (HTML). In contrast to HTML, which employs a static page-based model, Flash can support dynamic graphical interfaces that programmatically change on the fly. In addition, Flash applications are stateful, networked programs that support a rich programming environment. Strictly speaking, Macromedia Flash is the authoring environment, and Flash Player is the program used to run the Shockwave Flash (SWF) files or applications, but the term "Flash" is sometimes used interchangeably to refer to the authoring environment, the player or the application files.

With Flash applications or movies, the authoring tool 11, such as Flash MX 2004 Interactive Development Environment (IDE), uses vector and raster graphics, a scripting language called ActionScript and bidirectional streaming of video and audio to generate Flash files (or "movies") as a compressed stream of bytecodes (a SWF file). Nearly all complex Flash applications are written entirely as ActionScript programs with minimal use of the IDE, other than for compilation. Macromedia Flash applications are typically created using an IDE, such as Macromedia Corporation's Flash MX2004, although the SWF file format is an open standard and other means of creating such files exist. Flash applications may include images, sound, video, user interface components and other program code or data. Flash program code is written in the ActionScript language, which supports object-oriented programming (OOP), exceptions, events, and has a native user interface component library. A Flash application is deployed from an application server 10 as a SWF file 17 that is referenced from web pages (e.g., at client 15) through the use of <object> or <embed> tags that are interpreted by a browser plugin. The browser 15 interprets these tags to start up the Flash player 16, which loads the SWF file 17 and begins execution. The tag determines the height and width of the region on the page in which the Flash player 16 will have control. The Flash player 16 handles all user interface (UI) events that occur over this region (such as mouse movements or click or key presses) and exercises total graphical control over the pixels specified.

When creating a multimedia work, testing is required to assess the work for performance, functionality and playback. Traditionally, Flash applications have been tested by hand. This involves human interaction with the application, usually following a planned test script, and the manual recording of errors. This process can be error-prone, unreliable, time-consuming, and/or expensive. While automated test frameworks do exist, they primarily support only unit tests written in ActionScript, the Flash programming language. Such ActionScript-based test frameworks suffer from a number of disadvantages. First, ActionScript code cannot generate native user interface (UI) events, such as mouse movement, clicks, and keyboard events or other events generated and handled at the host operating system level. In addition, because current implementations of the Flash player present a single-threaded execution environment to ActionScript code when running as a browser plugin, an ActionScript test script cannot run in concert with an executing Flash application, which means that the Flash application cannot make progress while a block of test code is executing. Another drawback with ActionScript tests is that the ActionScript language cannot access the actual graphical output of the Flash player for verification, which means that such tests cannot be considered true end-to-end tests for a Flash application. In addition, ActionScript tests cannot be integrated into existing web testing frameworks without significant extra work, which requires that separate test suites for Flash and HTML be maintained rather than testing a website as an integrated whole. Moreover, a web page containing two or more separate Flash movies cannot be effectively tested with a test script written in ActionScript, since it must execute in one and only one Flash player at a time. Finally, ActionScript does not provide a large and feature-rich language that more sophisticated systems programming languages (such as Java) support. ("Java" is a trademark of Sun Microsystems, Inc.) These libraries can be useful when writing sophisticated tests of an application.

As seen from the foregoing, a need exists for an improved automated testing framework for testing multimedia works, such as Flash applications. Conventional testing approaches suffer from the numerous drawbacks and limitations or are otherwise ineffective, as explained hereinabove. Further limitations and disadvantages of conventional systems will become apparent to one of skill in the art after reviewing the remainder of the present application with reference to the drawings and detailed description which follow.

SUMMARY OF THE INVENTION

In accordance with one or more embodiments of the present invention, a system and method are provided for testing graphical programs, such as interactive Flash applications that are deployed via the web and execute within a web browser. In accordance with various illustrative embodiments, Flash application test scripts may be executed externally from the player running the Flash application under test by using an external application programming interface (API) to communicate with the Flash application under test. Commands from the external API are translated by a command interpreter at the Flash player, which responds to each command with a result, such as a requested value. For example, the command interpreter returns proxy objects to represent any symbolic value in the Flash application execution environment being accessed for reading or writing, for any function to be called or for supporting any other command. In a selected embodiment, the command interpreter uses an object lookup table or similar functionality to return proxy objects corresponding to the symbolic value being accessed. With the approach of using an external testing tool to manipulate proxy objects in place of symbolic values in the Flash memory space, the test tool language for the external testing tool may be selected from any desired language to provide enhanced testing functionality. For example, a Java-based API may be used to write test code which provides methods for generating native user input events, capturing and processing the image output of the Flash player, accessing arbitrary data from the Flash player, and executing arbitrary code within the Flash player.

The objects, advantages and other novel features of the present invention will be apparent from the following detailed description when read in conjunction with the appended claims and attached drawings.

Figure 1:
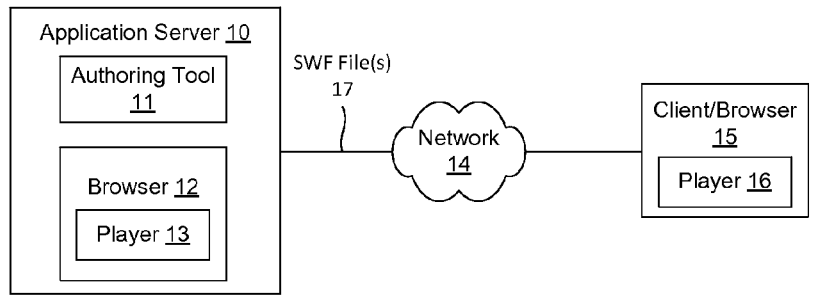
FIG. 1 illustrates an Internet-based system for distributing multimedia works using server-deployed software.

It is noted that elements illustrated in the figures are illustrated in diagrammatic form for simplicity and clarity. Further, where considered appropriate, reference numerals have been repeated among the drawings to represent corresponding or analogous elements.

DETAILED DESCRIPTION

An automated testing framework for Flash applications is described which uses externally executed test scripts to generate native UI events in the host operating system natively, capture the graphical or auditory output of the Flash player, read and write data values in the Flash player and execute functions defined in the Flash player. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
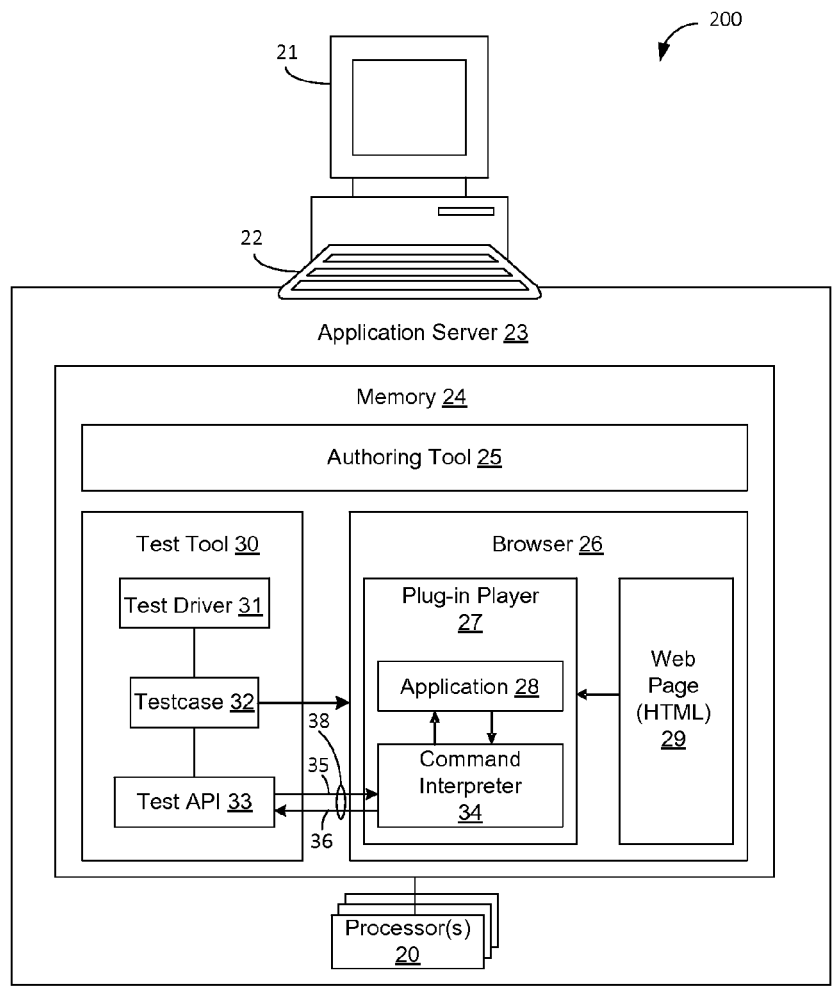
FIG. 2 is an architectural diagram of an exemplary computer system for authoring and testing multimedia works in accordance with various illustrative embodiments of the present invention.

Referring now to FIG. 2, there is illustrated an architectural diagram of an exemplary computer system 200 for authoring and testing multimedia works in accordance with various illustrative embodiments of the present invention. The computer system 200 may be found in many forms including, for example, mainframes, minicomputers, workstations, servers, personal computers, internet terminals, notebooks, wireless or mobile computing devices (including personal digital assistants), embedded systems and other information handling systems, which are designed to provide computing power to one or more users, either locally or remotely. In the example depicted in FIG. 2, the computer system 200 is implemented as an application server 23 which includes a memory storage device 24 (which may include mass storage memory and local RAM memory), one or more microprocessor or central processing units (CPU) 20, an input device 22 (e.g., keyboard, mouse, etc.) and an output device 21 (e.g., display, speakers, etc.).

The memory storage device 24 stores program and data files that are used for creating, testing and playing multimedia works, including a multimedia authoring program 25, a multimedia testing program 30, a multimedia playback program 26 and multimedia data files or applications 28. In particular, the memory storage device 24 includes an addressable memory that is used to load the multimedia authoring program 25 for operation by the processor 20 during the creation of a multimedia application 28, and for temporarily storing the application 28 during its creation. The memory 24 also stores a browser program 26 and player program 27 which are used to playback a multimedia application 28. In addition, the memory 24 stores a testing tool program 30 which is used to test the multimedia application 28 after or as the application 28 is created by the multimedia authoring program 25. These program and data files are accessed by the processor 20 as needed for the creating, playback and testing of multimedia works.

The processor 20, in one embodiment, is a 32-bit or 64-bit microprocessor manufactured by IBM, by Motorola (such as the 680X0 processor), or by Intel (such as the 80X86 or Pentium processor). However, any other suitable single or multiple microprocessors or microcomputers may be utilized. Computer programs and data are generally stored as instructions and data in mass storage until loaded into main memory 24 for execution. Main memory 24 may be comprised of dynamic random access memory (DRAM). As will be appreciated by those skilled in the art, the processor 20 may be connected directly (or through an interface or bus) to a variety of peripheral and system components, such as a hard disk drive, cache memory, traditional I/O devices (such as display monitors, mouse-type input devices, floppy disk drives, speaker systems, keyboards, hard drive, CD-ROM drive, modems, printers), network interfaces, terminal devices, televisions, sound devices, voice recognition devices, electronic pen devices, and mass storage devices such as tape drives, hard disks, compact disk ("CD") drives, digital versatile disk ("DVD") drives, and magneto-optical drives. The peripheral devices usually communicate with the processor over one or more buses and/or bridges. Thus, persons of ordinary skill in the art will recognize that the foregoing components and devices are used as examples for the sake of conceptual clarity and that various configuration modifications are common.

The processor 20 receives inputs from a variety of different sources that are used to create interactive graphical multimedia works. For example, a keyboard 22 is used to input commands and data for controlling the operation of the processor 20 and the multimedia programs 25, 26, 30 in a conventional manner, and for providing content for a multimedia art work. An electronic pointing device (such as a mouse, a touch pad, a joystick, and the like) may also be used to control the multimedia programs 25, 26, 30. Additional content may be input from an image source (such as a scanner for scanning text, graphics, photographs, and other images), a video source and/or an audio source (such as a MIDI source or MP3 player that provides coded audio information).

As multimedia works increasingly become interactive and feature-rich, the size and complexity of the code for such works also increases. For example, an HTML web page 29 being executed at the browser 26 may include one or more Flash application components which consist of large amounts of code in multiple files, including sound, video, graphics and text files. To ensure correctness, reliability, performance, and maintainability over time, this code needs to be tested. FIG. 2 depicts a framework to facilitate complex and comprehensive testing of graphical programs, such as Flash applications. The framework may be implemented as a software package that includes a test tool 30 for testing a multimedia application 28 that is executed by a playback program, such as a browser 26. In the test tool 30, a test driver 31 invokes code for the test case 32 which executes outside of the player execution environment 27. The driver 31 may call, invoke or execute one or more of the test case scripts sequentially or in parallel. To support external execution of the test cases 32, the test tool 30 uses a test API 33 in the test tool 30 to communicate with a command interpreter 34 in the player 27. In particular, the test API 33 communicates the externally executed test cases 32 to the player 27 using a sequence of commands 35 and responses 36 that are exchanged over a communications channel 38 with a command interpreter 34.

By executing test cases 32 in a separate process that is external to the player 27, the test scripts may be written in any language and then communicated with the player 27 using the test API 33. The separately executed test script feature provides improved or different test script functionality than would otherwise be allowed if the test scripts were executed within the execution environment of the player 27. For example, by writing the test cases 32 and test API 33 with a sophisticated systems programming language (such as Java), a larger and more feature-rich API is provided than would otherwise be available if the test scripts and testing framework were written with the language of the player 27 (such as ActionScript). This allows test scripts to leverage existing libraries of code, including existing testing frameworks for other UI technologies that integrate with Flash, such as HTML. In particular, test code written using a Java-based test API 33 provides methods for generating native user input events, capturing and processing the image output of the Flash player, accessing arbitrary data from the Flash player, testing multiple movies at the same time, and/or executing arbitrary code within the Flash player. In addition, Java-based test scripts support a wide range of platforms and browsers and allow a test script to be written independently of the platform and browser being used for the test. This facilitates cross-platform and cross-browser testing. Any or all of these features may be used to provide improved testing of complex and feature rich applications, such as Flash applications. Since the test scripts are external to the player, they can be randomized, data-driven, and synchronized in complex ways that simulate real user behavior in a way that is not readily feasible for ActionScript test scripts to support, given current technology.

To implement external test script execution, the system 200 includes a command interpreter 34 in the player 27 that accepts commands 35 from the Test API 33 and responds to each command with its result 36. The command interpreter 34 may be configured to allow any symbolic value in the memory space of the player 27 to be accessed for reading or writing. In addition, the command interpreter 34 may be designed to call any method or function in the player memory space, and to support other commands. At the command interpreter 34, each interpreted command 35 results in a return value, which is serialized and sent as the response 36 to the Test API 33.

Communications between the Test API 33 and command interpreter 34 are exchanged over a communications channel 38. The channel 38 allows the Test API 33 to send commands 35 to the interpreter 34, which is listening for them in the player 27. In a selected embodiment, the communications channel 38 may be implemented as a full-duplex TCP/IP socket where messages are null-terminated text strings. However, any communication technology may be used to implement the channel 38 that provides adequate speed, reliability, efficiency, etc.

Figure 3:
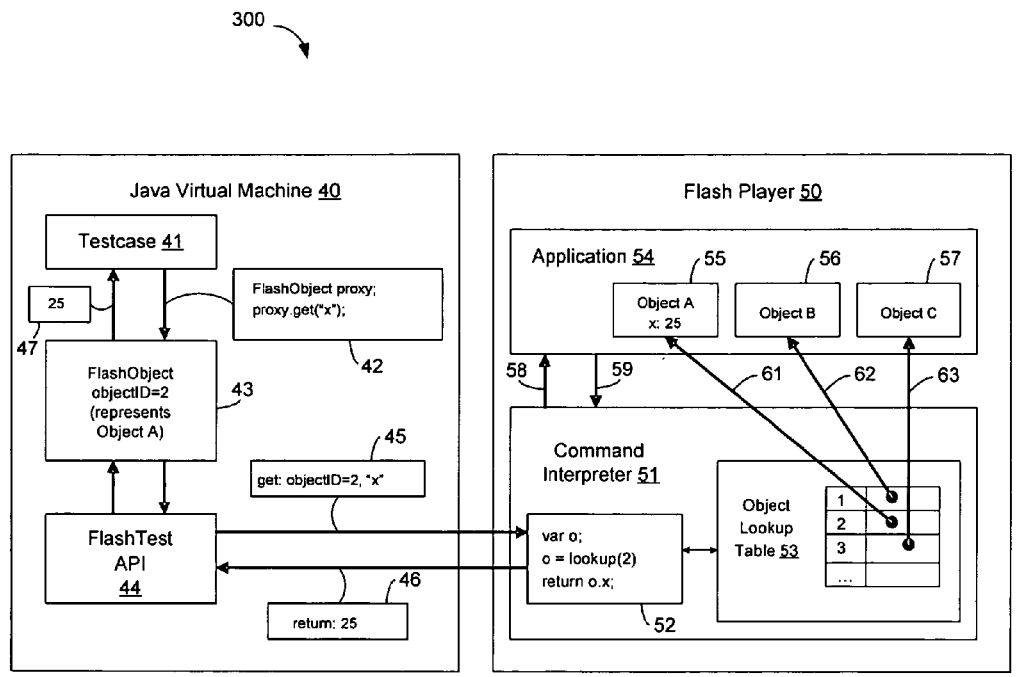
FIG. 3 diagrammatically illustrates a Flash application testing system which uses proxy objects to represent symbol objects in a Flash execution environment in accordance with various illustrative embodiments of the present invention.

FIG. 3 diagrammatically illustrates a Flash application testing system 300 which uses proxy objects in the Java virtual test machine 40 to represent symbol objects from a Flash player 50 execution environment in accordance with various illustrative embodiments of the present invention. Rather than transferring the entirety of the Flash player 50 execution environment to the test machine 40, the example Java-based test machine 40 uses a proxy object representation to implement an example test case 41. In particular, each time the command interpreter 51 executes a command 58 that returns 59 an object (e.g., Object A 55) from the Flash application 54, the object is assigned an ID (e.g., ObjectID=2), and location or pointer information 61 for the object is stored in the lookup table 53 at a table location corresponding to the ID (e.g., 53-2). The table 33 also stores location or pointer information for other previously-returned objects in the Flash player execution environment, so that location 53-1 is the ID for storing a pointer 62 to Object B 56, and location 53-3 is the ID for storing a pointer 63 to Object C 57. The command interpreter 51 then sends the ID to the test machine 40 which places the ID in memory. At higher layers of abstraction (such as Java), the ID may be a data member of an object so that it is a property of a proxy object (in fact, the essential property), but not an object per se. In this way, the test machine 40 uses the ID to create a proxy object for purposes of representing the original object in Flash. By storing location or pointer information in the object lookup table 53 for each object returned from the Flash player 50 to the Java test machine 40, the table 53 may be used to perform ID-to-object mapping to retrieve the original object when a subsequent command refers to the object by its ID and indicates the object should be manipulated in some way or that a method on the object should be invoked or a property read or written.

An example sequence is illustrated in FIG. 3 for a test case 41 which issues a Java read command 42 that requests a variable value (x) associated with a Flash object (Object A) in an application 54 being executed by the Flash player 50. To retrieve the value, the read command 42 (e.g., FlashObject; proxy.get("x")) in the test case 41 references a proxy object 43 (e.g., FlashObject ObjectID=2) that has previously been assigned to the requested object (e.g., Object A). The test API 44 implements the Java read command 42 as a read command 45 in the language of the Flash player 50 (e.g., get: objectID=2, "x") and sends the command 45 to a command interpreter 51 at the Flash player 50. The command interpreter 51 treats the command 45 as a request to return or output a variable associated with the identified object, and uses an object lookup table 53 to translate the proxy object identifier (e.g., ObjectID=2) into the actual requested object (Object A 55) in the Flash execution environment. While the lookup operation may be performed in any desired way, a selected embodiment of the command interpreter 51 uses script commands 52 (e.g., var o; o=lookup(2); return o.x)) to access the object lookup table 53 at a location corresponding to or specified by the proxy object ID (e.g., entry "2"), which stores a pointer or location 61 for the requested object (e.g., Object A 55) in the Flash execution environment 54. Using the stored pointer or location information from the lookup table 53, the command interpreter 51 issues a read request 58 to the Flash application 54 for the value (x) for the requested object (Object A), and this value (25) is then returned 59 to the command interpreter 51. The command interpreter 51 then sends a response 46 to the test API 44 which provides the requested value (25) for the proxy object 43 (objectID=2) in the response 47 to the testcase 41. As seen from the foregoing, the use of proxy objects allows code in one language (Java) to effectively reference and manipulate an object in another (Flash). Thus, proxy objects are used to represent objects returned by the command interpreter from the Flash execution environment.

As disclosed herein, externally executed test scripts can be used with proxy objects to facilitate complex and comprehensive testing of interactive graphical applications that include large amounts of code in multiple files (such as Macromedia Flash applications) to ensure correctness, reliability, performance, and maintainability over time. To illustrate this, an example test sequence for a Flash test framework is illustrated in FIGS. 4-8 to show how such a framework can be used to execute a sequence of test scripts to assess how a Flash object for a "Price" button on a web page reacts to a user interaction in the form of a mouse click.

Figure 4:
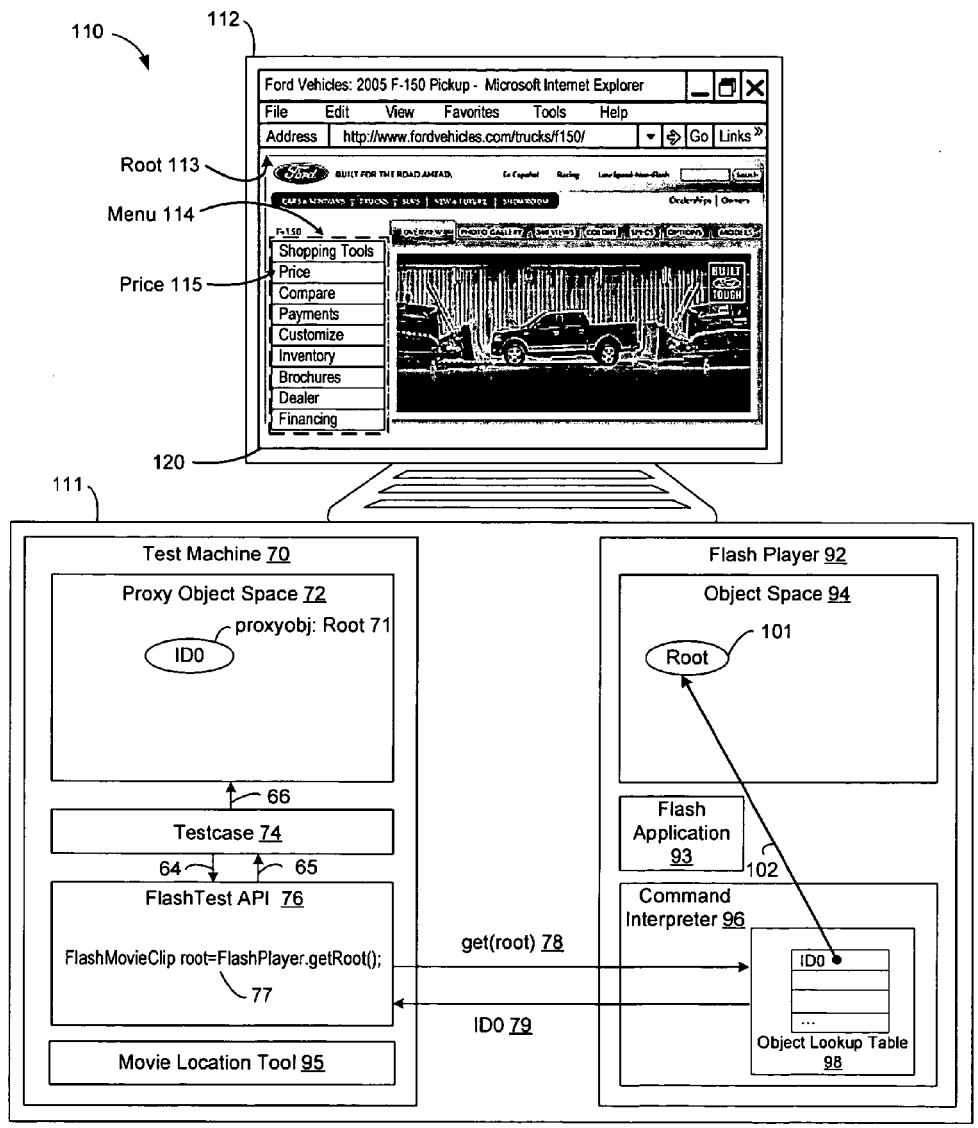
FIG. 4 diagrammatically depicts the execution of a first test step on a Flash test framework in accordance with an illustrative embodiment of the present invention.

Starting with FIG. 4, the Flash test framework 110 is diagrammatically depicted as a computer system including a monitor or screen 112 and a memory 111 in which is stored a test machine module 70 and a Flash player module 92. In the Flash player 92, a Flash application 93 is running as part of a browser program (not shown) to display a web page 120 on the monitor or screen 112. In this example, the web page 120 includes information concerning Ford F-150 Trucks. For each Flash object in the web page 120 being displayed by the Flash application 93, the Flash memory space 94 stores a corresponding object as part of a connected object tree 101, 103, 105 which is constructed in accordance with the Flash programming principles. Thus, to specify a "Price" button 115 located in a menu region 114 on the web page 120, the object space 94 includes a first Root object 101 which identifies the starting location coordinates 113 for the display region 120 for the web page. Connected to the Root object 101 is a menu region object 103 which symbolically identifies the location coordinates for the menu region 114 for the web page. Finally, a Price object 105 is connected to the menu region object 103 to symbolically identify the location coordinates for the "Price" button 115 in relation to the menu region 114.

Rather than testing the Flash application 93 by directly manipulating the objects 101, 103, 105 in the execution environment of the Flash player 92, the test machine 70 creates a proxy object memory space 72 for storing values that stand in place of the Flash objects 101, 103, 105. This is accomplished by using a test API 76 and command interpreter 96 to allow any symbolic value in the Flash object memory space 94 to be represented by proxy objects in the proxy object memory space 72. An example of how proxy objects are created and used is illustrated in FIG. 4, which shows that the testcase 74 issues a first test step 77 to the test API 76, as indicated at communication line 64. In this example, the first test step 77 (e.g., FlashMovieClip root=FlashPlayer.getRoot( )) requests the root location information for the Flash movie being executed using a first language (e.g., Java). At the test API 76, the first test step 77 is translated for purposes of issuing a command 78 (e.g., get(root)) to the command interpreter 96 in a second language (e.g., ActionScript). At the command interpreter 96, the command 78 is executed by assigning an ID (e.g., ID0) to the requested Root object 101, storing the Root object 101 in the object lookup table 98 in a location corresponding to the assigned ID (or alternatively storing location or pointer information 102 for the Root object 101 in the table 98), and then sending the assigned ID (e.g., ID0) as a response 79 to the test API 76. At the test API 76, the response 79 (e.g., ID0) is used to construct a new proxy object (if the object is being referenced for the first time) or to look up an existing proxy object (if the object had been previously referenced). The constructed/retrieved proxy object is forwarded to the testcase 74 (as indicated at communication line 65) for storage as a proxy object 71 in the proxy object memory space 72 (as indicated at communication line 66).

Figure 5:
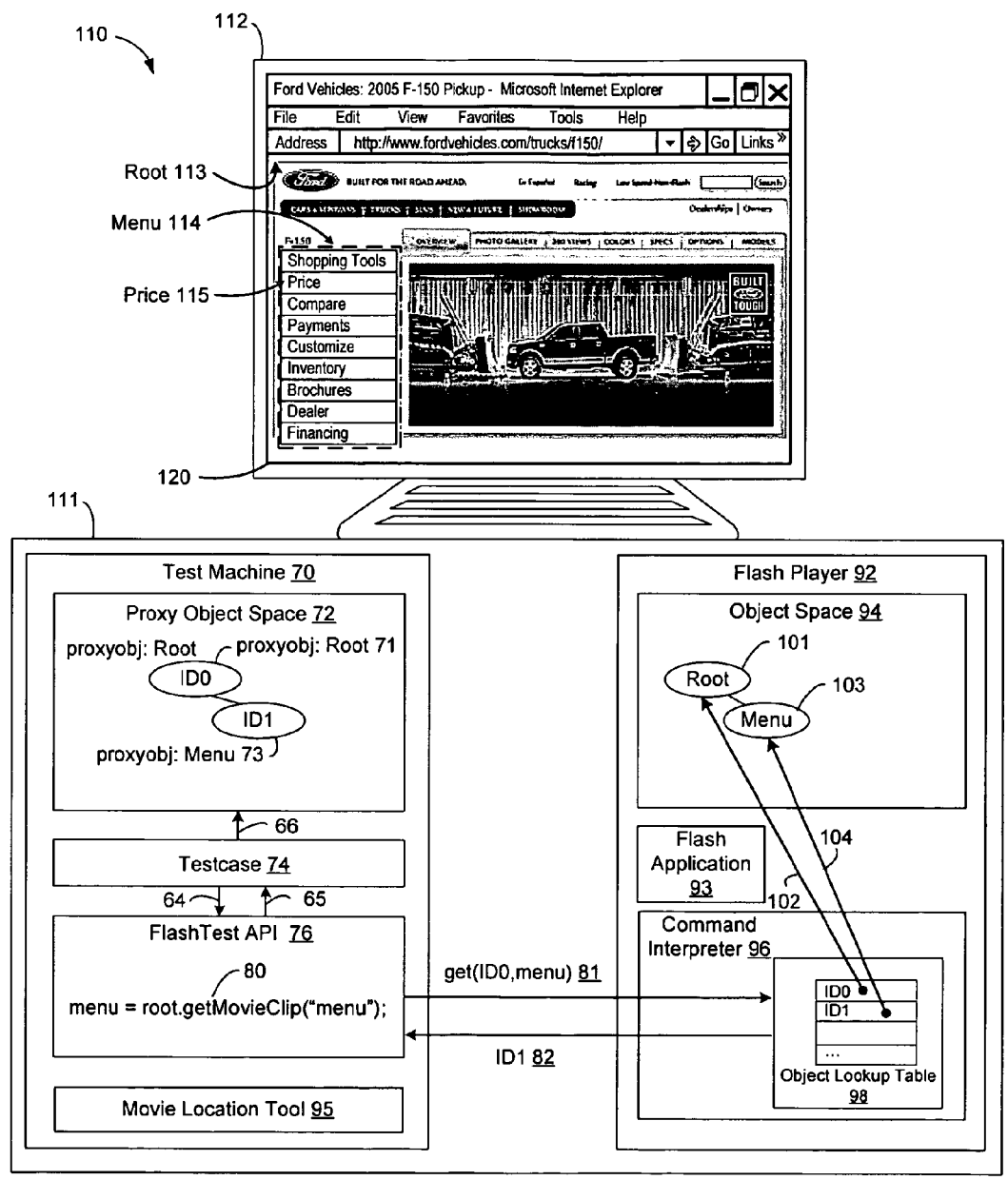
FIG. 5 diagrammatically depicts the execution of a second test step on a Flash test framework in accordance with an illustrative embodiment of the present invention.

For purposes of further illustrating various illustrative embodiments of the present invention, FIG. 5 diagrammatically depicts the execution of a second test step 80 on the Flash test framework 110. As illustrated, the testcase 74 issues a second test step 80 to the test API 76 (as indicated at communication line 64), where the second test step 80 (e.g., menu=root.getMovieClip("menu")) requests the location information for the menu region 114 in the Flash movie being played. At the test API 76, the second test step 80 is translated from a first language to a second language for purposes of issuing a command 81 (e.g., get(ID0, menu)) to the command interpreter 96. At the command interpreter 96, the command 81 is executed by assigning an ID (e.g., ID1) to the requested Menu object 103, storing the Menu object 103 in the object lookup table 98 in the table location corresponding to the assigned ID (or alternatively storing location or pointer information 104 for the Menu object 103 in the table 98), and then sending the assigned ID (e.g., ID1) as a response 82 to the test API 76. At the test API 76, the response 82 (e.g., ID1) is used to construct or look up a proxy object that is forwarded to the testcase 74, as indicated at communication line 65, for storage as a proxy object 73 in the proxy object memory space 72, as indicated at communication line 66.

Figure 6:
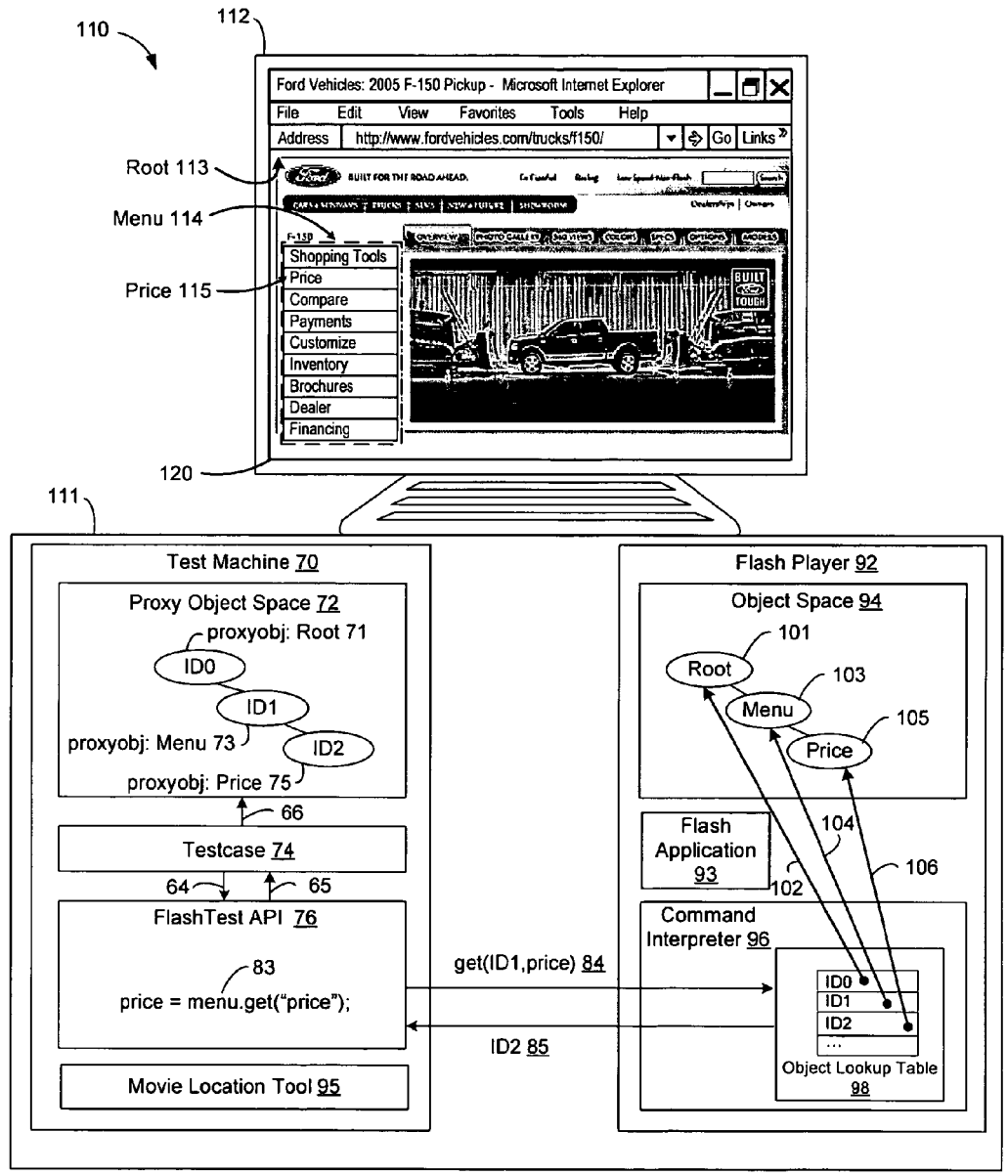
FIG. 6 diagrammatically depicts the execution of a third test step on a Flash test framework in accordance with an illustrative embodiment of the present invention.

For purposes of further illustrating various illustrative embodiments of the present invention, FIG. 6 diagrammatically depicts the execution of a third test step 83 on the Flash test framework 110. As illustrated in FIG. 6, the testcase 74 issues a third test step 83 to the test API 76, as indicated at communication line 64, where the third test step 83 (e.g., price=menu.get("price")) requests the location information for the Price button 115 in the Flash movie 120 being played. At the test API 76, the third test step 83 is translated from a first language to a second language for purposes of issuing a command 84 (e.g., get(ID1, price)) to the command interpreter 96. At the command interpreter 96, the command 84 is executed by assigning an ID (e.g., ID2) to the requested Price object 105, storing the Price object 105 in the object lookup table 98 in the table location corresponding to the assigned ID (or alternatively storing location or pointer information 106 for the Price object 105 in the table 98), and then sending the assigned ID (e.g., ID2) as a response 85 to the test API 76. At the test API 76, the response 85 (e.g., ID2) is used to construct or look up a proxy object that is forwarded to the testcase 74, as indicated at communication line 65, for storage as a proxy object 75 in the proxy object memory space 72, as indicated at communication line 66.

Figure 7:
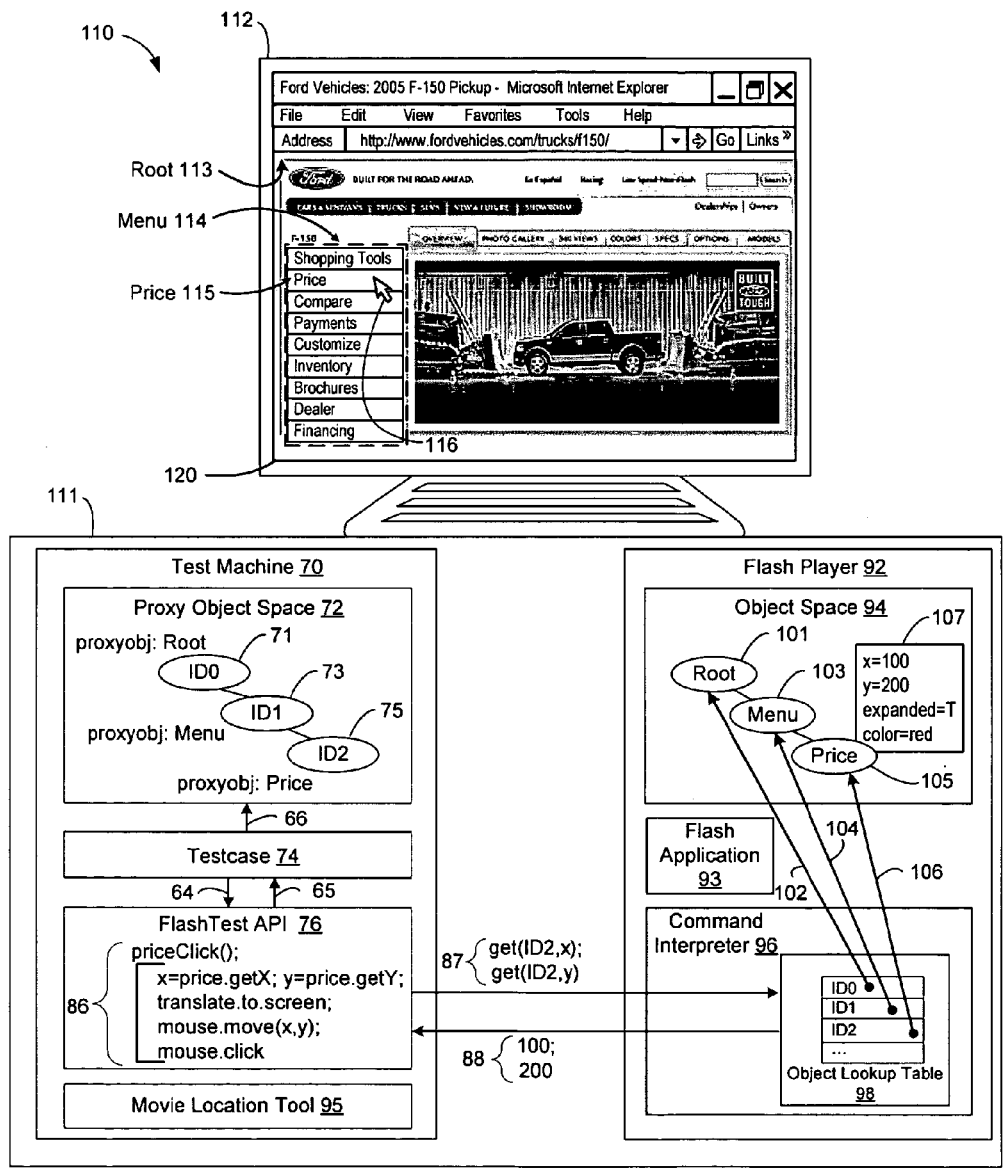
FIG. 7 diagrammatically depicts the execution of a fourth test step on a Flash test framework in accordance with an illustrative embodiment of the present invention.

As a result of the foregoing sequence of steps, a proxy object tree 71, 73, 75 is constructed in the proxy object memory space 72 that corresponds directly to the Flash object tree 101, 103, 105 stored in the Flash object memory space 94. With such a proxy object representation, the test machine module 70 may execute functions defined in the Flash player 92, thereby providing additional testing functionality for better simulating user interaction with a Flash application 93. An example is provided with reference to FIG. 7, which diagrammatically depicts the execution of a fourth test step 86 on the Flash test framework 110. As illustrated in FIG. 7, the testcase 74 issues the fourth test step 86 to the test API 76 (as indicated at communication line 64), where the fourth test step 86 (e.g., priceClick( )) performs a native user input event, such as placing and clicking the cursor 116 over the Price button 115 in the Flash movie 120 being played. At the test API 76, the fourth test step 86 may be translated and or processed using a first sequence of commands to retrieve the location coordinates for the Price button 115 in the Flash movie 120 (e.g., x=get(x); y=get(y)), translate those coordinates to screen coordinates (e.g., translate.to.screen), move the mouse/cursor to the screen coordinates (e.g., mouse.move(x,y)), and then click the mouse/cursor (e.g., mouse.click).

In order to precisely specify the location of a point or group of points within the Flash player's graphical region 120 in terms of screen coordinates, the location of the Flash movie 120 on the screen 112 is required. Knowing the position of the movie 120 allows the test framework 110 to support methods that click on a graphical component or retrieve the pixels that represent it onscreen. A selected embodiment of the present invention uses a movie location tool 95 in the external test machine tool 70 to determine the position of the Flash movie 120. For example, the movie location tool 95 finds an arbitrarily-small movie 120 on the screen 112 by moving the mouse/cursor 116 to a predetermined pattern of points on the screen 112 and checking to see if the mouse is over the player's graphical region. While any pattern of points may be used, one approach is to divide the screen 112 into increasingly smaller regions by making a series of passes across the screen 112. In a first pass, the center point the screen 112 is checked. In a second pass, four points on the screen 112 are checked by moving the cursor to the center of each screen quadrant and to each mid-point position there-between. In a third pass, each screen quadrant is divided into sub-quadrants and the center point of each sub-quadrant is checked. The process may continue to check increasingly small regions until a Flash movie is located, or until a predetermined termination event occurs, such as failing to detect a movie after checking regions of a predetermined size. Regardless of the algorithm used to move the mouse and see if the mouse is over the player's graphical region, the extra knowledge of the position of the Flash movie 120 on the screen 112 is indispensible to performing graphical testing.

By invoking the movie location tool 95 to determine the location of the Flash movie 120, the test API 76 can then process the first sequence of commands 86 into a second sequence of commands 87 (e.g., get(ID2, x); get(ID2, y)) which are issued to the command interpreter 96. At the command interpreter 96, the second sequence of commands 87 are executed by using the assigned ID for the Price button 115 (e.g., ID2) to directly access the Price button 115 the object lookup table 98 or to indirectly access the Price button 115 by using pointer information 106 for the Price object 105 from the object lookup table 98. The requested coordinate values (x=100, y=200) are then retrieved from a data table 107 associated with the Price object 105 and sent back to the test API 76 as a response 88. At the test API 76, the response 88 (e.g., 100; 200) is treated as a proxy object that is forwarded to the testcase 74, which uses the response 88 to execute the first sequence of commands 86 (e.g., translate to screen; mouse.move(x,y); mouse.click) and/or for storage with Price proxy object 75 in the proxy object memory space 72, as indicated at communication line 66.

Figure 8:
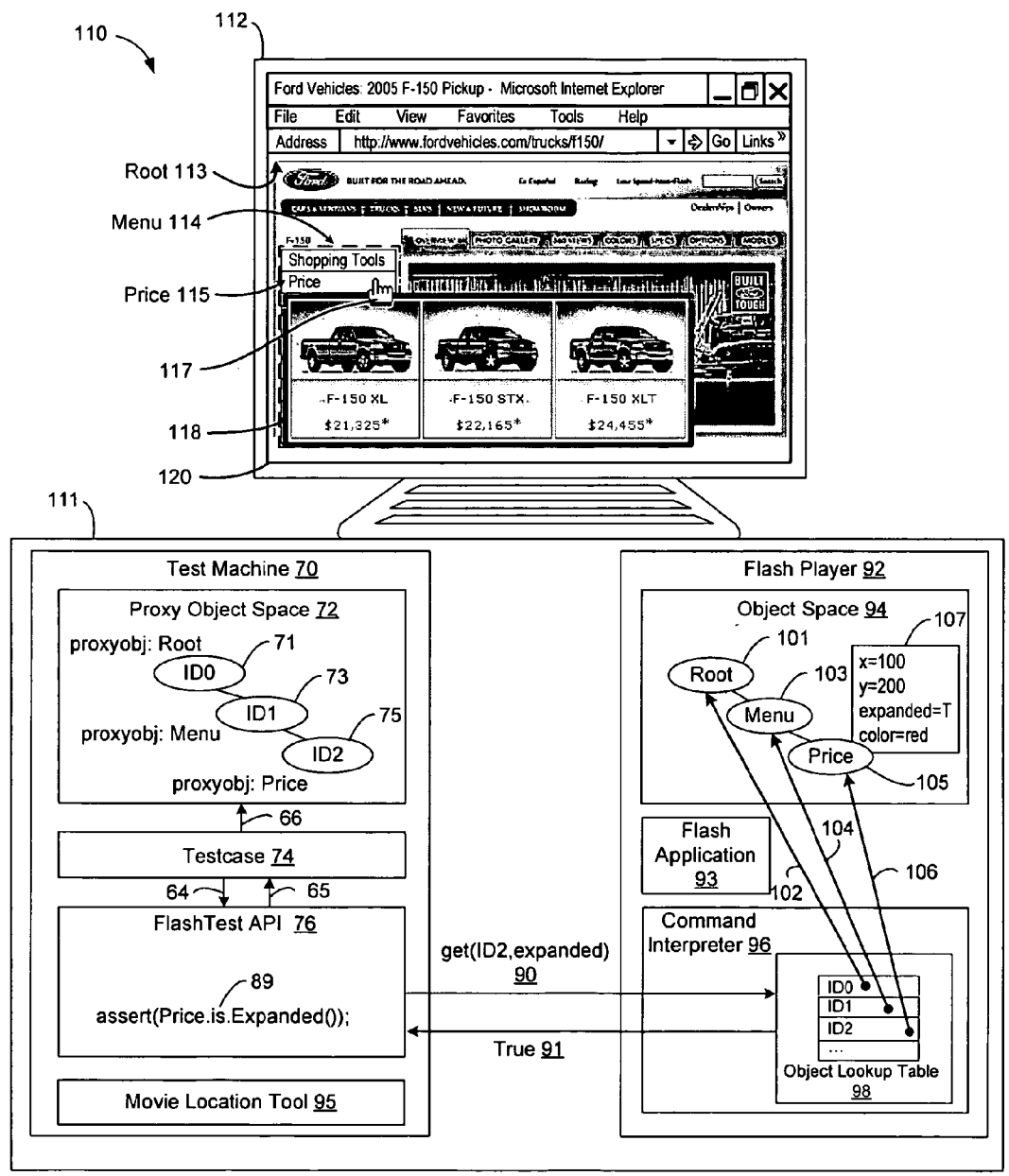
FIG. 8 diagrammatically depicts the execution of a fifth test step on a Flash test framework in accordance with an illustrative embodiment of the present invention.

Having used the test steps to locate and click on the Price button 115, the test machine 70 may now use the proxy objects to test the Flash application 93 to confirm that a drop-down menu 118 for the Price button 115 is working properly when the cursor 117 is clicked over the Price button 115. This is illustrated in FIG. 8, which diagrammatically depicts the execution of a fifth test step 89 on the Flash test framework 110. As illustrated in FIG. 8, the testcase 74 issues a fifth test step 89 to the test API 76, as indicated at communication line 64, where the fifth test step 89 (e.g., assert (Price.is.Expanded( )) inquires if the Price button 115 is expanded into a drop-down menu 118 in the Flash movie 120 being played. At the test API 76, the fifth test step 89 is translated for purposes of issuing a command 90 (e.g., get (ID2, expanded)) to the command interpreter 96. At the command interpreter 96, the command 90 is executed by using the assigned ID for the Price button 115 (e.g., ID2) to access pointer information 106 for the Price object 105 from the object lookup table 98. The requested information from the "expanded" field (e.g., True) is then retrieved from the data table 107 associated with the Price object 105 and sent back to the test API 76 as a response 91. At the test API 76, the response 91 (e.g., True) is treated as a proxy object that is forwarded to the testcase 74, which uses the response as part of the test steps to assess if the Price button 115 is expanded when the cursor 117 is located and clicked over the Price button 115. In addition or in the alternative, the response 91 may be stored with proxy object 75 in the proxy object memory space 72, as indicated at communication line 66.

As will be appreciated, the external test machine tool 70 may be used to perform other testing functions on the Flash application 93, including reading and writing data values in the Flash player 92. For example, the test API 76 may be configured to issue a write command (e.g., set(ID2, "x", 200)) to the command interpreter 96 for purposes of setting a data value in one of the Flash objects (e.g., changing the "x" value in the Price object 105 from 100 to 200). Other functions in the Flash player 92 may also be invoked by the test steps in the test machine 70. For example, the test API 76 may be configured to issue a command (e.g., call (ID2, "turn red")) which causes the command interpreter 96 to execute a function defined in the Flash player 92 (e.g., accessing the table 107 associated with the Price object 105 to change the color of the Price button 115 to red). While the Flash test framework 110 supports arbitrarily complex test scripts, it also can support simple keyword-driven test scripts. Keyword-based scripts are very simple text descriptions of a test that can be written by non-programmers. In a selected embodiment, the Flash test framework 110 supports these by adding another layer of code on top of the test API 76 that maps a keyword-based script to a series of calls against the test API 76.

In the computer-based system and methodology described herein, automated testing of a multimedia application is disclosed. Under the framework, a multimedia application (such as a Flash application) to be tested is written in a first language (such as ActionScript), is executed in a player module (such as a Flash player), and includes a first object. The multimedia application is tested with externally executed test scripts written in a second language (such as Java) which uses a proxy object in an external test module to represent the first object in the player module. With this approach, the functional testing limitations of the first language may be supplemented with the testing capabilities of the second language. For example, the test scripts written in the second language may be used to generate a native user interface event in the external test module, or may be used to capture at least one graphical or auditory output of the player module, or may be used to read or write data values in the player module, or may be used to execute functions defined in the player module. Correspondence between the proxy object and the first object is maintained by translating the first test script into a command, sending the command from the external test module to the player module, interpreting the command by accessing a lookup table at the player module, and then returning a value to the external test module in response to the command which serves as a proxy object in the external test module.

In accordance with various embodiments of the present invention, an automated testing framework for Flash applications is implemented as an article of manufacture having at least one recordable medium having stored thereon executable instructions and data. When the instructions and data are executed by one or more processing devices, a Flash application having a first object is executed in a Flash player module written in a first language (e.g., ActionScript), and one or more test scripts are executed to test the Flash application in an external test module that is written in a second language (e.g., Java). In operation, the external test module uses one or more proxy objects to represent corresponding objects in the Flash application. In an example implementation, external test module translates a first test script into a command or sequence of commands (e.g., a command sequence), and then sends the command sequence to the Flash player module where it is interpreted by accessing a table at the Flash player module to return a value to the external test module in response to the command sequence. The returned value is used to create or reference a proxy object in the external test module to represent various operations at the Flash player, such as a native user interface event, a graphical or auditory output of the Flash player, or a data read/write operation. In this way, an automated testing framework for Flash applications is provided which includes an external test machine for generating native user interface events in the host system. The external test machine tests the Flash application under test by issuing a test script as a command. The command is translated into or implemented in a language of the Flash player using an application programming interface at the external test machine and a command interpreter at the Flash player to return a value representing a symbolic value in the Flash application under test. As translated, the test script may be used to generate native UI events, capture a graphical or auditory output of the Flash player, read and write data values in the Flash player or execute functions defined in the Flash player.

The methods and systems for automatically testing complex interactive multimedia applications as shown and described herein may be implemented in software stored on a computer-readable medium and executed as a computer program on a general purpose or special purpose computer to perform certain tasks. The software discussed herein may include script, batch, or other executable files. The software may be stored on a machine-readable or computer-readable storage medium, and is otherwise available to direct the operation of the computer system as described herein and claimed below. In one embodiment, the software uses instructions and data stored in a local or database memory to implement a Flash application testing framework that supports arbitrarily complex and comprehensive tests for a Flash application. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module. The computer-based data processing system described above is for purposes of example only, and may be implemented in any type of computer system or programming or processing environment, or in a computer program, alone or in conjunction with hardware. It is contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries. In addition, some portions of the description provided herein are presented in terms of algorithms or operations on data within a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, assessing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A computer-based method for testing a multimedia application with a test framework, comprising:
    executing a multimedia application comprising a first object in a multimedia application player;
    executing at least a first test script to test the multimedia application in a separate process external to the player using a test application programming interface (API) to communicate with the player, where the separate process uses a first proxy object to represent the first object;
    accepting one or more commands from the test API at a command interpreter in the player; and
    executing a received command at the command interpreter by accessing a table at the player module to access a first symbolic value in a memory space of the player.

2. The method of claim 1, where the first test script and test API are written in Actionscript or Java programming language.

3. The method of claim 1, where the first test script is executed by the separate process to send a command from the test API to the player to generate a native user input event in the multimedia application.

4. The method of claim 1, where the first test script is executed by the separate process to send a command from the test API to the player to capture and/or process an image output generated by the player.

5. The method of claim 1, where the first test script is executed by the separate process to send a command from the test API to the player to access data from the player.

6. The method of claim 1, where the first test script is executed by the separate process to send a command from the test API to the player to execute code within the player.

7. The method of claim 1, further comprising returning a result to the test API from the command interpreter for each received command.

8. The method of claim 1, further comprising executing a sequence of commands and associated return values over a communications channel between the test API and the command interpreter.

9. The method of claim 1, where the first proxy object is created at the separate process in Java to represent the first object which is created at the player so that a test script in the separate process can use the first proxy object to effectively reference and/or manipulate the first object.

10. A computer program product comprising non-transitory computer-readable medium encoded with a computer program adapted to be executed by one or more processors to implement a method for testing a multimedia application comprising a first object in a player by executing at least a first test script to test the multimedia application in a separate process external to the player using a test application programming interface (API) to communicate with the player, where the separate process uses a first proxy object to represent the first object, and by locating a graphical region displayed on a screen by the player by executing a location tool in the separate process to move a cursor over a predetermined pattern of points on the screen and checking to see if the cursor is over the graphical region until one or more screen coordinates for a specified point or group of points in the graphical region are specified.

11. The computer program product of claim 10, where the first test script is executed by the separate process to send a command from the test API to the player to generate a native user input event in the multimedia application, to send a command from the test API to the player to capture and/or process an image output generated by the player, to send a command from the test API to the player to access arbitrary data from the player, or to send a command from the test API to the player to execute arbitrary code within the player.

12. The computer program product of claim 10, where the computer program is further adapted to be executed by one or more processors to implement a method for testing of the multimedia application by sending one or more commands from the test API to a command interpreter in the player.

13. An automated testing framework system for testing one or more multimedia applications executing on a multimedia application player, the system comprising a processor coupled to a memory storing program code, and the code when executed by the processor configures a computer system into a machine that in operation provides:
    a test case generator comprising a plurality of test scripts for generating a plurality of test cases in an Actionscript or Java programming language,
    a test application programming interface (API) for communicating between the plurality of test cases and the multimedia application using one or more proxy objects to represent one or more corresponding objects in the multimedia application under test, where the test API communicates with a command interpreter in the multimedia application player using a sequence of commands and responses that are exchanged over a communications channel between the test API and command interpreter, and
    a movie location tool for locating a graphical region displayed on a screen by the multimedia application player by moving a cursor over a predetermined pattern of points on the screen and checking to see if the cursor is over the graphical region until one or more screen coordinates for a specified point or group of points in the graphical region are specified,
    where the test case generator and test API are executed in a Java virtual machine that is external to the multimedia application player running the multimedia application under test.

14. The automated testing framework system of claim 13, where a first test script is executed by the Java virtual machine to send a command from the test API to the multimedia application player to generate a native user input event in the multimedia application, to send a command from the test API to the multimedia application player to capture and/or process an image output generated by the multimedia application player, to send a command from the test API to the multimedia application player to access arbitrary data from the multimedia application player, or to send a command from the test API to the multimedia application player to execute arbitrary code within the multimedia application player.

15. A computer-based method for testing a multimedia application with a test framework, comprising:
   executing a multimedia application comprising a first object in a multimedia application player;
   executing at least a first test script to test the multimedia application in a separate process external to the multimedia application player using a test application programming interface (API) to communicate with the multimedia application player, where the separate process uses a first proxy object to represent the first object; and
   locating a graphical region displayed on a screen by the multimedia application player by executing a location tool in the separate process to move a cursor over a predetermined pattern of points on the screen and checking to see if the cursor is over the graphical region until one or more screen coordinates for a specified point or group of points in the graphical region are specified.

16. The method of claim 15, where executing the location tool comprises dividing the screen into increasingly smaller regions by making a series of passes across the screen, comprising a first pass where a center point of the screen is checked to see if the center point is over the graphical region, a second pass where four quadrant center points on the screen and each mid-point position therebetween are checked to see if any point is over the graphical region, and a third pass where each screen quadrant is divided into sub-quadrants and each center point of each sub-quadrant is checked to see if any point is over the graphical region.

* * * * *